L. M. LINDER.
SURFACE SCRAPER OR GRADER.
APPLICATION FILED OCT. 10, 1910.
981,437.
Patented Jan. 10, 1911.
2 SHEETS—SHEET 2.
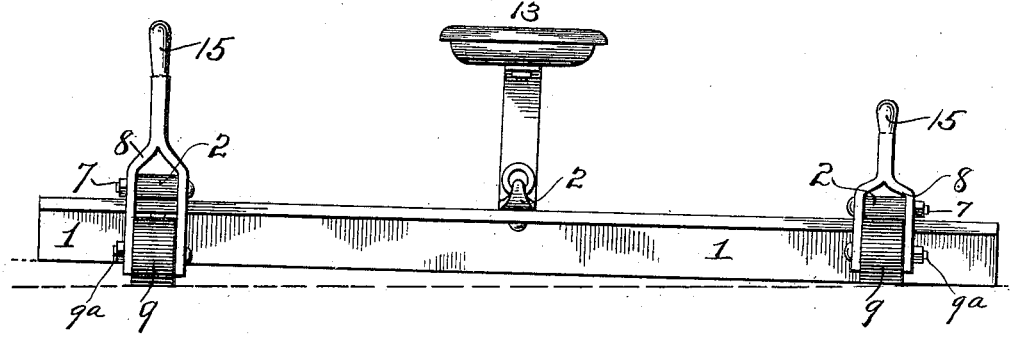
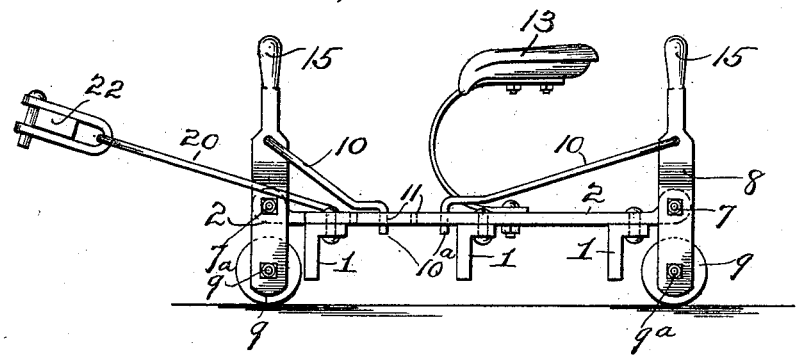
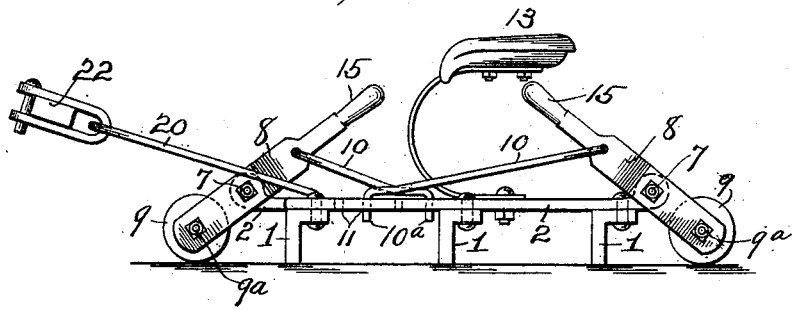
WITNESSES
INVENTOR
L. M. Linder
By H. A. Seymour
Attorney

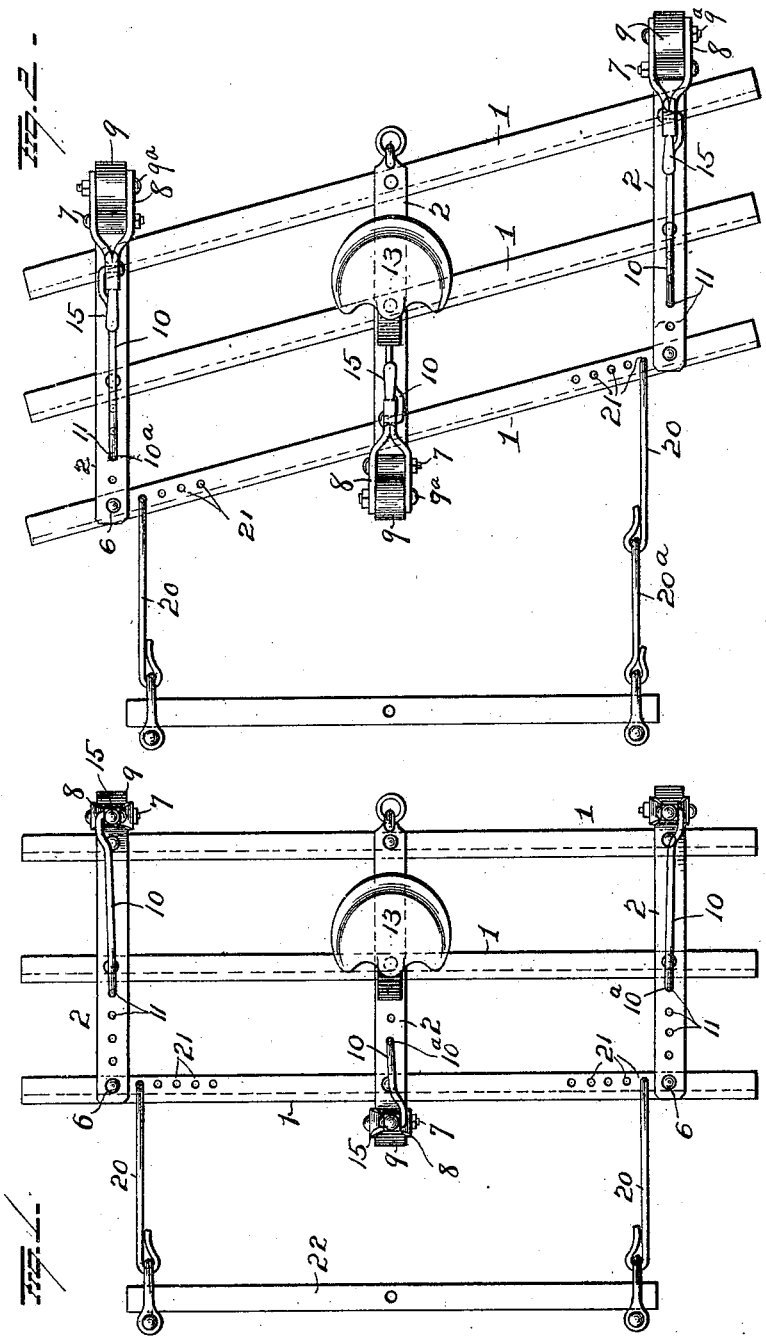

UNITED STATES PATENT OFFICE.

LEMON M. LINDER, OF MATTHEWS, INDIANA.

SURFACE SCRAPER OR GRADER.

981,437.  Specification of Letters Patent.  Patented Jan. 10, 1911.

Application filed October 10, 1910. Serial No. 586,364.

*To all whom it may concern:*

Be it known that I, LEMON M. LINDER, of Matthews, in the county of Grant and State of Indiana, have invented certain new and useful Improvements in Surface Scrapers or Graders; and I do hereby declare the following to be a full, clear, and exact description of the invention, such as will enable others skilled in the art to which it appertains to make and use the same.

My invention relates to an improvement in surface scrapers or graders, and it consists in the parts and combinations of parts as will be more fully described and pointed out in the claims.

In the accompanying drawings, Figure 1 is a view in plan showing the scrapers parallel with the hitch bar, and the carrying wheels in their lowered positions; Fig. 2 is a similar view showing the scrapers arranged obliquely to the hitch bar, and the carrying wheels turned so as to lower the scraper bars; Fig. 3 is a view in rear elevation showing one of the carrying wheels adjusted to elevate the scrapers and the other to permit the scraper to ride on the ground; Fig. 4 is a view in end elevation of Fig. 1, and Fig. 5 is a similar view with the scrapers lowered.

The grader or scraper frame comprises the scraper blades 1, preferably three, pivotally connected by the cross bars 2, the latter being secured by loose rivets or bolts 6 to the upper horizontal members of the scraper blades. Each blade 1 is L-shaped in cross section with its shorter members horizontal, and its longer members, constituting the scraper blade proper, depending from the horizontal section. The cross bars 2, are, as shown, pivotally secured to the horizontal members of the blades, and each end cross bar 2 is provided at its rear end, and the middle cross bar 2 is provided at its front end, with an enlargement having a hole therethrough for the passage of the bolts or pivots 7, on which the wheel carrying frames 8 are mounted. These frames may each be a lever bifurcated at its lower end to straddle or embrace the ends of the cross bars 2 and the carrying wheels 9, the latter being journaled on the axles 9ª carried by the frames 8 at the lower ends as shown. The construction of the parts is such that when the carrying frames 8 are in their vertical positions as shown in Figs. 1 and 4, the wheels 9 will support the lower edges of the scraper bars 9 in a plane above the top of the ground, and when the wheel carrying frames 8, are turned to the position shown in Figs. 2 and 5, the scraper will rest in contact with the ground, and by adjusting and securing the carrying frame 8 at one rear corner in its vertical position and the other one secured as in Fig. 5, the scrapers will be adjusted as shown in Fig. 3, to grade inclined road beds.

Each carrying frame 8 terminates at its upper end in a handle 15, all three of which are in convenient reach of the operator's seat 13, and each carries above its fulcrum, a hook rod 10, the hooked end 10ª of which is adapted to be entered in any one of a series of holes 11 in the cross bars 2 for holding the frames 8 in their adjusted position.

The front scraper bar 1 is provided with a series of holes 21 on each side of the longitudinal center for the attachment of the links 20 carrying the hitch bar 22. The links 20 are of the same length, consequently hold the scraper or grader blades 1 parallel with the hitch bar, but when it is desired to adjust them obliquely to the hitch bar so as to carry the surplus earth laterally, as shown in Fig. 2, an additional link 20ª is inserted at one side between the hitch bar and the front scraper blade. The three blades are parallel and are maintained so by the cross bars, but as the latter are loosely secured to the scraper bars, the relative position of the scraper blades to the line of draft may be readily changed without affecting their parallelism, by simply increasing the length of the draft links at either side as shown.

For the purpose of equalizing the weight, I have located the operator's seat 13, which is secured to the yielding support 12, on the center cross bar 2, at or near the longitudinal center of the latter, and if desired, I may provide one of the cross bars 2, preferably the central one, at its rear end, with a hitch or lifting ring, by means of which power may be applied for pulling it rearwardly, or for lifting it. By providing carrying wheels journaled in adjustable frames, I am enabled to so adjust the parts that the scrapers will rest wholly on the ground, or rest on the ground at one end only or be wholly supported above the ground which is necessary for local transportation from one locality or field to another.

The apparatus is specially adapted for grading road-beds, and for filling ruts or furrows on farm lands and for smoothing any irregular surfaces in roads or fields.

It is evident that many slight changes might be resorted to in the relative arrangement of parts shown and described without departing from the spirit and scope of my invention. Hence I would have it understood that I do not wish to confine myself to the exact construction and arrangement of parts shown and described, but, Having fully described my invention what I claim as new and desire to secure by Letters-Patent, is:—

1. In a surface scraper and grader, the combination with a hitch bar, a series of parallel scraper bars and a series of cross bars pivotally connecting the scraper bars, whereby the position of the scraper bars with relation to the hitch bar may be varied without affecting the parallelism of the scraper bars, of two carrying wheels located adjacent the ends of the rear scraper bar, a carrying wheel located adjacent the center of the front scraper bar, and means for raising and lowering said wheels independently of each other.

2. In a surface grader, the combination with a series of parallel scraper bars and a series of cross bars pivotally connecting the scraper bars, of two wheel carrying frames journaled to the scraper adjacent the outer ends of the rear scraper bar, a wheel carrying frame journaled to the scraper adjacent to the center of the front scraper bar, each frame carrying a ground wheel, and a hooked rod secured to each frame and adapted to enter holes in the cross bar for locking the wheel carrying frames in vertical or inclined positions.

3. The combination with a series of parallel L-shaped scraper bars, and a series of parallel cross bars having loose connection with the scraper bars, two of said cross bars having an enlarged rear end and the middle cross bar having an enlarged front end, of a wheel carrying frame journaled to each enlarged end, a wheel journaled in each frame, and a securing rod pivoted to each frame and adapted to enter holes in the cross bars for locking the carrying frames in the several positions.

4. The combination with a series of parallel scraper bars and a series of parallel cross bars pivotally secured to the scraper bars, of adjustable wheel carrying frames mounted on the rear end of two outer cross bars, a hitch ring secured to the rear end of an intermediate cross bar, and an adjustable wheel carrying frame mounted on the front end of an intermediate cross bar.

5. The combination with a hitch bar, a series of parallel scraper bars, and three cross bars pivotally connecting said scraper bars whereby the position of the scraper bars with relation to the hitch bar may be varied without affecting the parallelism of the scraper bars, of two adjustable wheel carrying frames mounted on the rear ends of the outer cross bars, an adjustable wheel carrying frame mounted on the front of the intermediate cross bar, and a seat secured to said intermediate cross bar.

In testimony whereof, I have signed this specification in the presence of two subscribing witnesses.

LEMON M. LINDER.

Witnesses:
  ALVA H. UNTHANK,
  C. J. OVERMAN.